United States Patent
Schaefer

(10) Patent No.: US 8,211,529 B2
(45) Date of Patent: Jul. 3, 2012

(54) SUBSTRATE PROVIDED WITH A DRESSING

(75) Inventor: Philipp Schaefer, Hannover (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1108 days.

(21) Appl. No.: 10/579,472

(22) PCT Filed: Nov. 15, 2004

(86) PCT No.: PCT/IB2004/003986
§ 371 (c)(1),
(2), (4) Date: Dec. 5, 2006

(87) PCT Pub. No.: WO2005/047549
PCT Pub. Date: May 26, 2005

(65) Prior Publication Data
US 2007/0082176 A1    Apr. 12, 2007

(30) Foreign Application Priority Data

Nov. 15, 2003  (DE) .............................. 203 17 670 U
Nov. 24, 2003  (AT) .............................. GM830/2003
Dec. 22, 2003  (AT) .............................. GM918/2003
Mar. 2, 2004   (AT) .............................. A 340/2004
Jun. 7, 2004   (AT) .............................. GM404/2004
Jul. 13, 2004  (AT) .............................. GM491/2004

(51) Int. Cl.
*B32B 3/24*      (2006.01)
*D06N 3/14*      (2006.01)

(52) U.S. Cl. ........ 428/151; 428/198; 428/904; 428/131; 428/137; 428/138; 156/232

(58) Field of Classification Search ................ 428/151, 428/131, 138, 137, 904, 198; 156/232
See application file for complete search history.

(56) References Cited

U.S. PATENT DOCUMENTS

| | | | | |
|---|---|---|---|---|
| 2,772,995 | A * | 12/1956 | Cooper | 442/328 |
| 2,994,617 | A * | 8/1961 | Proctor | 428/138 |
| 3,695,988 | A * | 10/1972 | Steigerwald | 428/131 |
| 4,751,116 | A | 6/1988 | Schaefer et al. | |
| 4,923,732 | A | 5/1990 | Schaefer | |
| 5,344,692 | A * | 9/1994 | Schmoock | 428/161 |
| 5,518,900 | A | 5/1996 | Nikiforov et al. | |
| 6,177,148 | B1 | 1/2001 | Walther et al. | |
| 6,451,404 | B1 * | 9/2002 | Nobuto et al. | 428/91 |

FOREIGN PATENT DOCUMENTS

DE    299 03 664    5/1999
(Continued)

*Primary Examiner* — William P Watkins, III
(74) *Attorney, Agent, or Firm* — Oblon, Spivak, McClelland, Maier & Neustadt, L.L.P.

(57) ABSTRACT

To endow a velourlike carrier (7), which has a finely fibrous surface, in particular a grain leather having a buffed topside or a synthetic velour material, and has been provided with a dressing (1) which has a grain texture on its face side the dressing (1) consisting of a consolidated polymeric dispersion and being produced separately on a substrate having a textured surface corresponding to the grain texture, with the requisite properties in terms of softness and abrasion resistance, but particularly in terms of air and water vapor permeability, the dressing (1) has capillaries (11) which extend throughout its entire thickness, which everywhere is substantially the same, and is bonded to the carrier (7) via a thin bonding layer (12) formed of a consolidated polymeric dispersion.

64 Claims, 6 Drawing Sheets

| | FOREIGN PATENT DOCUMENTS | | JP | 3-71337 | 3/1991 |
|---|---|---|---|---|---|
| DE | 201 17 724 | 1/2002 | JP | 3-117996 | 5/1991 |
| EP | 0 640 715 | 3/1995 | JP | 08-13351 | 1/1996 |
| JP | 01-111077 | 4/1989 | | | |

* cited by examiner

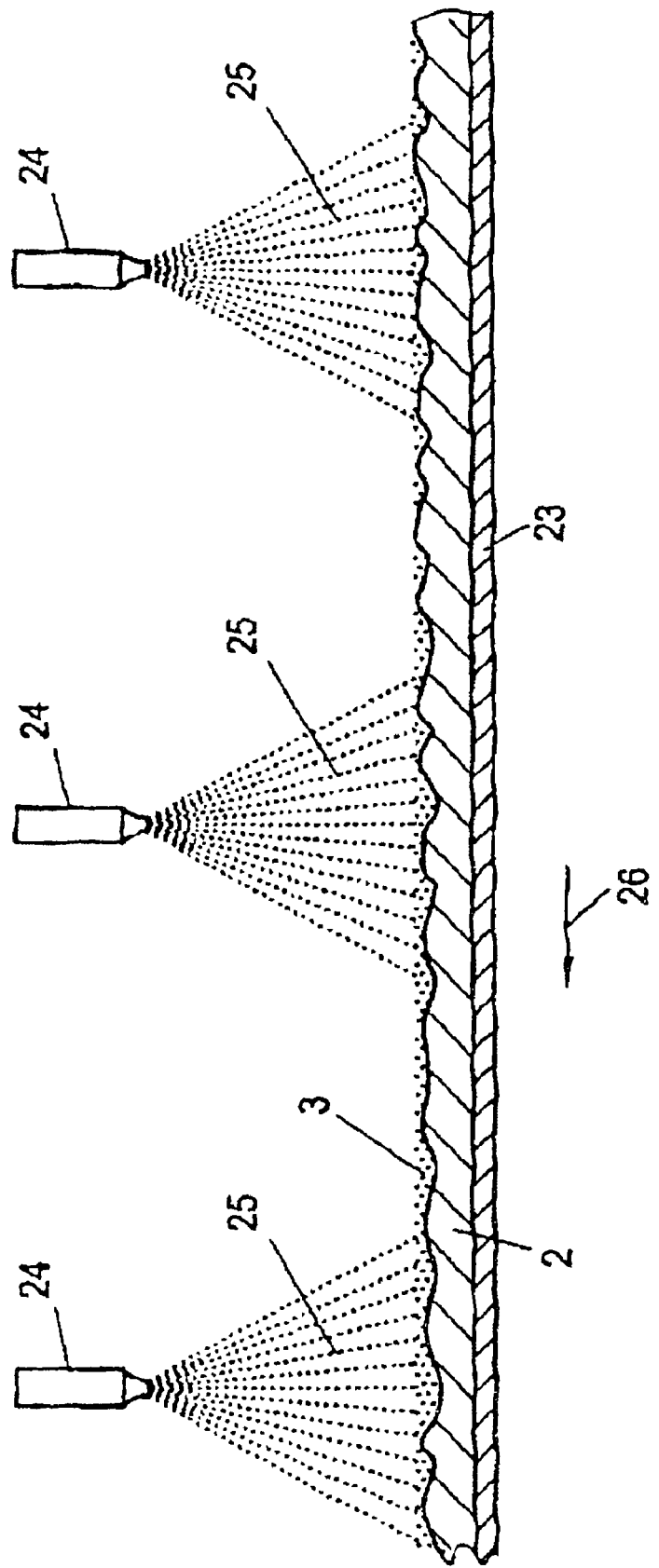

SUBSTRATE PROVIDED WITH A DRESSING

BACKGROUND OF THE INVENTION

1. Field of the Invention

This invention relates to a carrier having a velourlike, finely fibrous topside, in particular a grain leather having a buffed grain side forming the topside, a split leather having a buffed topside or a synthetic velour material having a topside consisting of microfibers, and provided with a dressing which has a grain texture on its face side, the dressing consisting of a consolidated polymeric dispersion and being produced separately on a substrate having a textured surface corresponding to the grain texture, and being bonded to the carrier via a bonding layer formed from a consolidated, polyurethane-containing polymeric dispersion and having been applied to the topside of the carrier. The term "grain texture" is to be understood as also comprehending a nubucklike configuration of the face side of the dressing.

2. Background of the Invention

Full-grain leathers, so-called aniline leathers, which have merely been dyed, but have no dressing on their grain side, have the desirable property of a particularly high air and water vapor permeability, but the grain side of these leathers is not abrasion-resistant, scratch-resistant, lightfast and impervious to soiling, so that these leathers cannot be used for the interiors of vehicles and for the manufacture of shoes.

It has therefore already been proposed to provide the topside of a leather, more particularly of a grain leather which has been incipiently buffed on its grain side, but also of a split leather, and also of a synthetic velour material, with a dressing having a grain texture in order that the face side thereof may have the requisite properties and a leatherlike appearance.

In an existing process, the dressing is initially produced separately on a silicone-rubber substrate having a textured surface corresponding to the grain texture of the dressing. This dressing is produced by a polymeric dispersion comprising not more than 60% by weight, generally 40% by weight, of solids being initially applied to the textured surface of the substrate by blade coating, spraying, roll application or casting, and being allowed to consolidate by heating. Immediately after application, the wet polymeric dispersion has a smooth surface, but, in the course of consolidation, the film formed by this polymeric dispersion shrinks as a result of the removal of water, and the dispersion sags down into the valleys in the texture on the substrate, and at the tips of the texture a dressing layer which is very thin or in circumstances even noncoherent is formed, in particular when the dressing is to have an attractive, deep grain and therefore the substrate has a corresponding, very highly defined texture.

This disadvantage arises particularly because only a thin layer of dispersion can be applied to the substrate, particularly when it has a highly defined texture, since problems can otherwise occur with the drying in that blistering and tearing of the dressing occurs particularly in the grain valleys of the textured substrate.

A further difficulty with the production of the dressing on a textured substrate is that the generally used polyurethane-containing aqueous polymeric dispersions having a solids content of more than 50% by weight is not commercially available and the low solids content of the dispersions which are commercially available engenders pronounced shrinkage on drying.

When a dressing separately produced by following such a known process is peeled off the silicone-rubber substrate, the side facing the textured surface thereof will form the face side of the dressing, so that the grain valleys of the dressing will only be of very low thickness and therefore predetermined breakage areas arise in the dressing as a result of notching and these predetermined breakage areas can result in visible damage to the dressing particularly when the leather provided with such a dressing is exposed to flexing or stretching. This is generally the case when the leather provided with such a dressing is used for the production of interior trim of motor vehicles and of seat cushions, but also as shoe material.

To avoid this disadvantage, it has hitherto always been necessary to provide, between the dressing and the surface of the leather, at least one layer, generally two or more layers, to compensate. Thus, it has already been proposed that the shrinkage loss of the first application of dispersion be compensated for by providing a thick compensating layer which also serves as bonding layer.

In this layered construction, adhesion problems frequently arise between the individual layers, so that there is at least some detachment of layers.

A significant disadvantage of known dressed leathers, particularly when at least one compensating layer is provided, is that the requisite air and water vapor permeability is nonexistent, since any pores or open cells present in the thin dressing are occluded by the compensating layer. This has a negative effect on the breathability of the dressed leather. Particularly in the case of a leather with a dressing having a coarse grain texture, however, bonding to the leather needs very thick compensating layers which adversely affect the properties of the leather.

U.S. Pat. No. 4,923,732 for instance discloses bonding the dressing to the leather surface via a thick compensating layer.

U.S. Pat. No. 4,751,116 and U.S. Pat. No. 6,177,148 likewise show a leather wherein the dressing is bonded to the leather via multiple layers. One of the bonding layers penetrates into the pores in the dressing and lines them, as a result of which water vapor permeability is greatly reduced and air permeability is practically nonexistent. It has therefore been proposed that the dressed leather be mechanically apertured. However, such mechanically produced apertures weaken the leather and lead to soiling of the surface.

Carriers are also known where their dressing is separately produced by applying a dispersion comprising polyurethane and also a crosslinker to a warm substrate. Application is effected in the known processes by blade coating, casting or by means of roll coating, whereby it is impossible to produce a uniformly thick, filmlike dressing. Nor are such thin films obtainable by means of a known spraying process, since a comparatively large amount have to be applied to produce the grain texture, leading to the formation of films of differing thickness in the grain peaks and grain valleys.

SUMMARY OF THE INVENTION

It is an object of the present invention to avoid the disadvantages mentioned and to provide a dressed carrier of the type described at the beginning, which has the requisite properties in terms of its softness, suppleness, abrasion resistance, but especially the air and water vapor permeability required for comfort, and the dressing of which is obtainable from an aqueous, i.e., solvent-free, polymeric dispersion. The present invention further has for its object to avoid that artificial leathers having a dressing formed from polymer solutions and artificial leathers having coagulated dressings will always have to be applied to the textured substrate using a blade coater in that the disadvantages of differing thickness are particularly applicable to these dressings. Particularly a dressing consisting of coagulated polyurethanes is damaged at its surface on contact with a lit cigarette. Moreover, such dressings are not solvent-resistant.

I have found that this object is achieved according to the present invention when the dressing has capillaries which extend through its entire thickness and has substantially the same thickness in the region of the grain peaks and in the region of the grain valleys, and is bonded to the carrier via a single thin bonding layer. The provision of the through-capillaries in the region of the grain peaks and in the region of the grain valleys significantly improves the requisite air and water vapor permeability when merely a single thin bonding layer is provided, and it is ensured at the same time that the dressing which has essentially the same thickness everywhere has no weak places and possesses the same strength in all areas, so that even bending and pulling stresses on the carrier do not lead to the dressing being damaged. Mechanical aperturing of the dressed carrier, which leads to weakening of the carrier, for the purpose of achieving the desired air and water vapor permeability is thus not necessary with the carrier being configured according to the present invention.

A further advantage is that even low water absorption leathers can be dressed in the manner of the present invention, these leathers combining breathability, i.e., air and water vapor permeability, with the ability of, when challenged by a large supply of water, as in the case of rain for example, not allowing the water to pass through the leather, unlike mechanically apertured leathers.

DETAILED DESCRIPTION OF THE INVENTION

The capillaries advantageously have different cross sections having a diameter between 0.005 mm and 0.05 mm, preferably between 0.009 mm and 0.02 mm, while optimal conditions result when there are at least 100 capillaries, preferably at least 250 capillaries, per an area of 100 cm$^2$ and these capillaries form substantially straight lines.

In a preferred embodiment of the present invention, the capillaries are randomly distributed in the dressing, so that the face side of the dressing has the appearance of the pore texture of a natural hide.

Optimum air and water vapor permeability is ensured when, in accordance with a further feature of the present invention, the bonding layer has interruptions or weak places of reduced thickness. This ensures that air and water vapor can pass virtually unhindered through the through-pores formed by the capillaries in the dressing and by the interruptions in the bonding layer which communicate with these capillaries, and thus, for example when the carrier is used for shoes, perspiration developed by the foot is taken up by the carrier itself and transported away via the bonding layer and the dressing. When the carrier of the present invention is used for upholstered furniture, moisture arising is transported via the dressing and the bonding layer to the carrier and taken up by the latter. Even in the case of hydrophobicized leathers having a thickness of more than 2 mm, the configuration according to the present invention attains a DIN 53333 water vapor transmission rate of more than 1.5 mg/cm$^2 \cdot$h.

The through-pores mentioned can be made visible by applying a colored contrast medium to the surface of the dressing and allowing it to seep into the pores and, after drying, making slice images of the dressed carrier.

The interruptions or weak places in the bonding layer are preferably achieved by the bonding layer being merely arranged partially on the surface of the carrier, so that no coherent layer is formed. It has been determined that the bonding between the carrier and the dressing is sufficient even in this case, while a very high air and water vapor permeability is ensured. This also provides the desired softness and an extremely high abrasion resistance, so that the parameters needed for the interior trim in the vehicle industry in particular are fulfilled while nonetheless good bonding between the dressing and the carrier is ensured.

In a preferred embodiment of the present invention, the bonding layer has a point-, screen- or grid-shaped texture, i.e. a netlike texture, so that interruptions are present and there is no whole-areal, flexurally stiff sandwich construction which has an adverse effect on bendability as well as air and water vapor permeability. In some cases, however, it suffices for improving the properties mentioned when the bonding layer has a maximum thickness between 0.01 mm and 0.05 mm and has a thickness between 0.002 mm and 0.01 mm in its weak places, in which case good air and water vapor permeability is achieved via these thin weak places and through which the bendability and surface bonding of the leather are also significantly improved.

When the topside of the carrier is fibrous, in particular finely fibrous, it is advantageous when the bonding layer is predominantly disposed in the region of the fiber tips, leaving hollow spaces therebetween which cause a pumping effect when the carrier provided with such a dressing is subjected to loading. It has been determined that the bonding achieved in this case between the fibrous surface of the carrier and the dressing is sufficient while the requisite high air and water vapor permeability, including in particular the pumping effect mentioned, is ensured. This pumping effect is effective when a pressure is exerted on the dressing, for example by sitting on a seat covered with a dressed carrier, the dressing is compressed and when the pressure on the dressing is relieved, in engendering a suction effect, whereby moisture occurring is rapidly absorbed by the carrier. Because the topside of the carrier has to be buffed to achieve a high air and water vapor permeability combined with the pumping effect, the use of leathers having surface defects as carriers also results in the advantage that these are no longer visible in the dressed leather.

It is advantageous when the bonding layer consists of a consolidated, polyurethane-containing, crosslinked polymeric dispersion, in particular of a consolidated polyester-polyurethane dispersion. It is advantageous in this connection when the polyurethane-containing dispersion has at least in part a wholly or partly crystalline structure. After its consolidation, but before its crosslinking, the bonding layer consisting of such a dispersion is thermoplastic and has a very low softening point, particularly when it still contains between 2% and 10% of water but is already dry to the touch. Such a bonding layer not only ensures a good connection between the carrier topside and the dressing, but also ensures that it cannot penetrate deeply into the interstices between the fibers/fiber tufts at the carrier topside and harshens these, and is heat-resistant in the crosslinked state.

It is advantageous for a good connection when the polymeric dispersion comprises tackifying additives, for example soft resins or soft polymers, in particular acrylates, whereby the adhesive effect of an already partly consolidated dispersion is improved.

In accordance with a further feature of the present invention, the polymeric dispersion may contain hollow microspheres having a diameter of less than 21 μm which form small droplets at the topside of the carrier which contain a gas on the inside, and thereby prevent further penetration of the applied polymeric dispersion into the carrier.

It will prove advantageous when the bonding layer has an areal weight between 20 g/m$^2$ and 90 g/m$^2$. In the case of carriers having an unbuffed or only finely incipiently buffed topside, the areal weight is advantageously between 20 g/m² and 45 g/m²; in the case of carriers having a deeply buffed topside and in the case of split leathers, the areal weight is advantageously between 45 g/m² and 90 g/m².

Optimum values with regard to air and water vapor permeability are achieved when the dressing in all cross-sectional regions has not only substantially the same thickness, but also approximately the same structure and the same density and thus has the same strength in all areas and there are no weak places which, when the dressed carrier is subjected to bending and stretching, lead to the dressing becoming damaged.

The dressing preferably consists of a combination of a consolidated polyurethane dispersion comprising a crosslinker and having a high softening point, and a consolidated polyurethane dispersion comprising a crosslinker and having a preferably wholly or partly crystalline structure having a low softening point, said dispersion being thermoplastic before crosslinking. The combined use of a polyurethane dispersion which leads to thermally stable films having elastomeric properties even before crosslinking, with a thermoplastic polyurethane dispersion having a preferably wholly or partly crystalline structure, as used as raw material for adhesives, is an optimal way of obtaining the desired properties.

In accordance with a further feature of the present invention, the dressing may contain hollow microspheres which form closed cells and have a diameter of less than 21 μm.

The dressing, unlike known dressings, does not have a foam structure which stores liquid in an undesirable manner, but the through-capillaries engender an air and water vapor permeability.

To control the soilability of the dressing, particularly in the case of light colors, a further feature of the present invention provides that the grain peaks in the dressing comprise microscopically small smooth elevations. However, the present invention also makes it possible for the face side of the dressing to have a nubuck texture whence protrude fine hairs likewise forming small elevations. The elevations advantageously have a diameter between 3 μm and 60 μm, preferably between 5 μm and 15 μm, and also a maximum length of 110 μm, and are arranged very closely together. These elevations, which can have the appearance of fine hairs, have the effect that wet soils in particular stay on the smooth surface of these elevations and do not descend into microinterstices between the grain peaks or in the grain texture, and thus prevent dirt becoming fixed to the entire surface of the dressing.

The positive effect is further improved when the dressing comprises waxes and/or silicones on its face side, which alter the surface tension of the dressing with regard to water.

In a further embodiment according to the present invention, the face side of the dressing may be provided with a very thin finish which does not impair the air and water vapor permeability, but which can be used to influence the hand and also the degree of luster or gloss.

Any polymeric impregnation which has become absorbed in a leather used as carrier and which has the functions of buffing dust binding and grain consolidation has no effect on air and water vapor permeability and is disregarded here.

To endow the dressed carrier with more volume and to make its face side nice to handle, it is possible according to the present invention for its side opposite to the topside, in particular the flesh side of a leather used as carrier, to be provided with a substantially roughened synthetic woven or knit having projecting fibers, which preferably has an areal weight of more than 250 g/m². The adhesive bond between this woven or knit and the carrier is effected by producing an adhesive effect between the fibers only. This woven or knit may be covered by a thin coating.

Animal hide from which leather is produced is a costly good, so that this hide should be optimally used. When the dressing is formed on the entire leather produced from such an animal hide, simultaneously in a single operation, further use will generate a considerable amount of waste due to the differing constitution of the hide in the individual regions. To substantially avoid this waste and to ensure optimal utilization of the leather hide, it is advantageous according to the present invention when cut formats are separated out of this hide, the dressing having a highly defined grain texture in the case of a cut format in the belly region and including a flat grain texture in the case of a cut format in the butt region.

The present invention method of producing a carrier provided on its face side with a dressing having a grain texture, in particular of producing a grain leather, a split leather with a buffed topside or a synthetic velour material with a topside consisting of microfibers, initially comprises, to form the dressing, an aqueous polymeric dispersion being applied to a silicone rubber substrate which has a textured surface corresponding to the grain texture of the dressing, and being allowed to consolidate as a film, a polymeric dispersion forming a bonding layer being applied to the topside of the carrier and the carrier being placed with this topside onto the film and subjected to a pressure and heat treatment, essentially comprises the solvent-free polymeric dispersion comprising polyurethane and also a crosslinker being applied to the substrate having a uniform temperature of less than 105° C. such that this polymeric dispersion immediately consolidates on impinging on the substrate and, after evaporation of water, a uniformly thick film having a net structure and a thickness of less than 0.04 mm being formed. This produces on the substrate a thin dressing which is equally thick everywhere and which has capillaries which extend through its entire thickness.

The polymeric dispersion consists of a combination of a polyurethane dispersion comprising a crosslinker and having a high softening point and a polyurethane dispersion comprising a crosslinker and having a preferably wholly or partly crystalline structure having a low softening point, said dispersion being thermoplastic before crosslinking.

The polymeric dispersion is applied to the substrate by means of a fine mist produced by spray nozzles having a small diameter, in such a small amount that the polymeric dispersion has water removed from it even as it is headed for the heated substrate and in any event this polymeric dispersion immediately consolidates on impinging on this substrate to such an extent at least that the polymeric dispersion cannot sag into the grain valleys of the textured substrate, but forms a uniformly thick, netlike film everywhere, which gives rise to the capillaries mentioned.

The textured surface of the substrate is preferably produced by molding off the grain texture of a natural leather.

However, particularly when the surface of the dressing is to have a velour effect, it is also possible to produce the textured surface of the substrate by laser treatment, so that a texture having very fine hairs is produced on the surface of the substrate. The laser treatment produced textured surface of the dressing can subsequently be multiplied via a master.

Preference is given to using a substrate which consists of addition-crosslinked silicone rubber and has a Shore hardness between 25 Shore A and 70 Shore A. Such a substrate is desirably elastomeric, so that the grain pattern is not destroyed in the concluding pressure and heat treatment. Moreover, the laser treatment of addition-crosslinked silicone rubber does not produce free radicals to interfere with the negative molding, so that the silicone rubber is able to develop depressions which later in the dressing have the appearance of very fine hairs or very fine fiber tufts and lead to a nubuck effect.

Advantageously, the substrate is composed of a heat-conductive silicone rubber having a density of more than 110 $g/cm^3$, preferably of more than 120 $g/cm^3$, and thus has good thermal conductivity, as is required for uniform heating during the sprayed application of the polymeric dispersion. To increase thermal conductivity, inorganic fillers may be embedded in the substrate. Preferably, the substrate has a thickness between 1 mm and 3 mm and is bonded to a thermally conductive support which preferably consists of aluminum and which may have a thickness between 1 mm and 3 mm. This thermally conductive support ensures uniform distribution of heat on the substrate.

According to the present invention, the bonding of the substrate to the thermally conductive support is effected by means of a one-component adhesive which embeds a thin nonwoven web material of synthetic fibers with a basis weight of less than 150 $g/m^2$. This embedding does not impair thermal conductivity, but greatly restrains the thermal expansion of the silicone rubber.

To form the bonding layer, it is provided according to the present invention that the polymeric dispersion applied to the topside of the carrier consists essentially of a polyurethane dispersion which has a low softening point and preferably a wholly or partly crystalline structure and of a crosslinker, such that, on impinging on the topside of the carrier, it rapidly consolidates and forms a noncoherent bonding layer. However, such a polymeric dispersion can also be applied so as to form a bonding layer having weak places of reduced thickness. Application here proceeds in the same way as the application of the polymeric dispersion to the silicone-rubber substrate to form the dressing in that in the present case, as a result of water being withdrawn from the dispersion as a consequence of the imbibition by the carrier as the dispersion impinges on the topside of the carrier, a netlike film is likewise formed on this topside in the same way as on the impinging of a dressing-forming dispersion on the warm substrate.

When the leather used as carrier has been hydrophobicized and therefore is not capable of taking up a lot of water, it is advantageous to heat the leather before the application of the dispersion forming the bonding layer.

Components of the kind known for the production of adhesives can be used for the dispersion forming the bonding layer.

The polymeric dispersion applied to the topside of the carrier should be dry to the touch, but preferably still contain residual moisture before the topside bearing this polymeric dispersion is laid onto the substantially water-free, net-structured film disposed on the substrate, and crosslinking must not as yet have taken place.

Subsequently, according to the present invention, the net-structured dressing-forming film on the substrate and the carrier placed on said film and provided with the polymeric dispersion forming the bonding layer are pressed together between resilient platens at a temperature between 60° C. and 105° C. and at a pressure of not more than 5 $kg/cm^2$. This pressing with heating causes the film which is on the carrier and which forms the bonding layer to become softer, because of its low softening point, than the film which is on the substrate and forms the dressing, so that the capillaries in the dressing remain intact. True, the film forming the bonding layer becomes tacky, but not liquid, so that the capillaries in the dressing are not occluded by it and this film does not flow together, i.e., retains its structure and the interruptions in the bonding layer remain intact. This ensures that, on the one hand, a sufficient bond forms between the dressing and the topside of the carrier and, on the other, the requisite air and water vapor permeability is ensured.

Lastly, for the purposes of complete drying and crosslinking, after pressing the carrier provided with the dressing can be subjected in the suspended state to drying to completion.

The invention will now be more particularly elucidated with reference to the drawings.

FIG. 9 is a schematic view of an apparatus for producing the dressing on a substrate and FIG. 10 is a schematic view of an apparatus for bonding the dressing to the topside of the leather.

Figure 1:
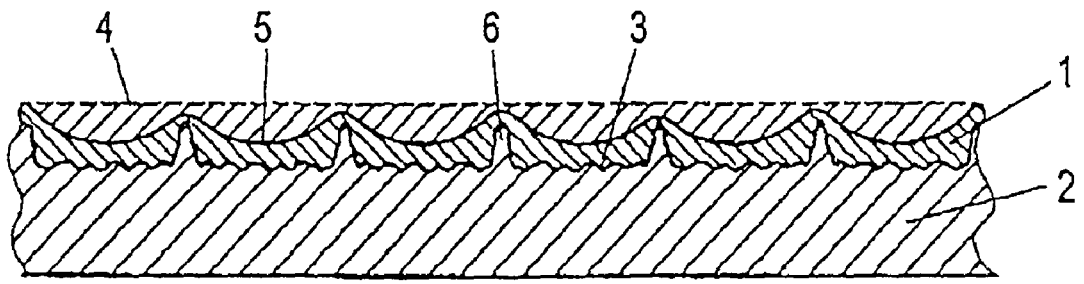
FIG. 1 is a sectional view of an existing process for producing a dressing on a silicone-rubber substrate and FIG. 2 is a sectional view of the construction of a leather provided with a dressing produced by following the existing process.

As is apparent from FIG. 1, hitherto the known production of a dressing 1 on a silicone-rubber substrate 2 was effected by the textured surface 3, corresponding to the grain texture of the dressing 1 to be produced, of this substrate 2 having applied to it, by blade coating, spraying, roll coating or casting, a polymeric dispersion which, in the illustrative embodiment according to FIG. 1, comprises about 55% solids. Immediately after application, this polymeric dispersion has a planar topside 4, shown as a broken line in FIG. 1. After drying due to heat being supplied via the substrate 2, the polymeric dispersion undergoes shrinkage due to the withdrawal of water, so that the film formed therefrom has a surface 5 comprising grain valleys and grain peaks. Since the polymeric dispersion sags into the interstices between the grain peaks 6 protruding from the substrate 2, the resulting film is clearly shown by the drawing to be very thin in the region of these grain peaks 6 protruding from the substrate 2, so that there is a danger of ruptures and damage there.

Figure 2:
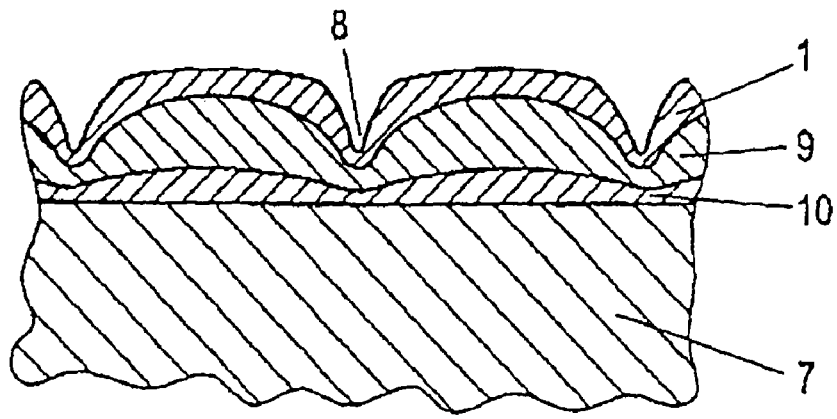

FIG. 2 shows a known leather 7 which has been provided with a dressing 1 as per FIG. 1. That side of the dressing 1 which faced the substrate 2 in FIG. 1 is now the face side, so that, as is evident from the drawing, the grain valleys 8 of the dressing 1 have an extremely low thickness. To compensate this disadvantage, two or more compensating layers 9 and 10 have to be provided between the leather and the dressing 1, while the compensating layer 9 in the illustrative embodiment depicted in the drawing consists of a foamed material and compensating layer 10 forms the adhesive layer. These comparatively thick compensating layers add to the overall thickness in an undesirable manner and have the particular effect that any pores or the like present in the dressing 1 are occluded, so that there is no longer any air permeability and water vapor permeability is significantly reduced.

Figure 3:
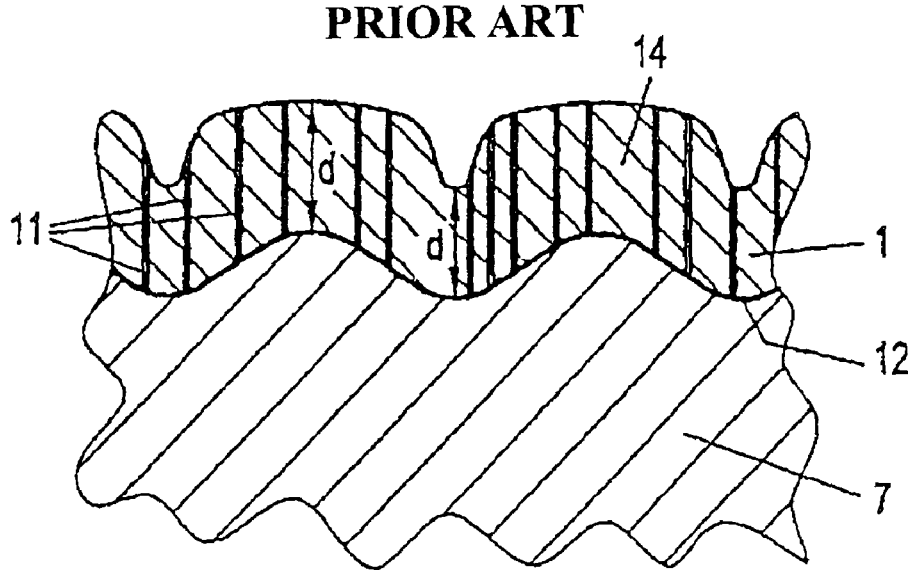
FIG. 3 is a sectional view of a dressed leather formed according to the present invention and FIG. 4 is a greatly enlarged depiction of a partial section through a dressed leather which is in accordance with the present invention.
Figure 4:
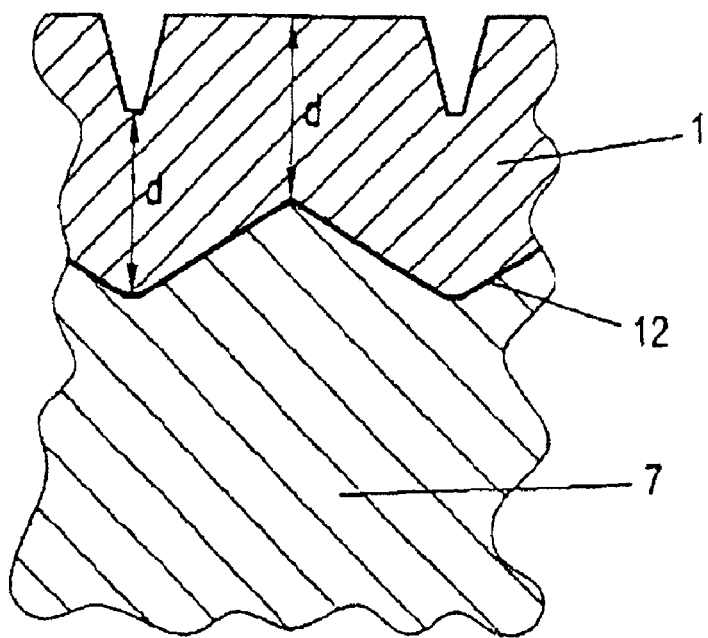

FIGS. 3 and 4 depict an inventive leather 7, particularly a leather buffed on its grain side or a split leather, provided with a dressing 1. As is evident from the drawing, the dressing 1 here has substantially the same thickness d in the region of the grain peaks and in the region of the grain valleys. There are thus no weak places of reduced thickness to undesirably impair the strength of the dressing 1.

As is further discernible from FIGS. 3 and 4, the dressing 1 has substantially straight-line capillaries 11 of differing cross section which extend through the entire thickness and which ensure the requisite air and water vapor permeability. These capillaries are very close to each other in a random, side by side arrangement, so that the dressing 1 has the appearance of the pores in an animal skin/hide, and have a diameter between 0.009 mm and 0.02 mm.

The dressing 1 is bonded to the leather 7 via a single, very thin bonding layer 12, which is substantially air and water vapor permeable. To this end, this bonding layer 12 may be provided merely partially on the surface of the leather 7, or have weak places of reduced thickness and/or interruptions.

The dressing 1 consists of a consolidated dispersion which comprises a portion of polyurethane of at least partly crystalline structure and also a crosslinker, and has approximately the same structure and the same density in all cross-sectional regions.

Figure 5:
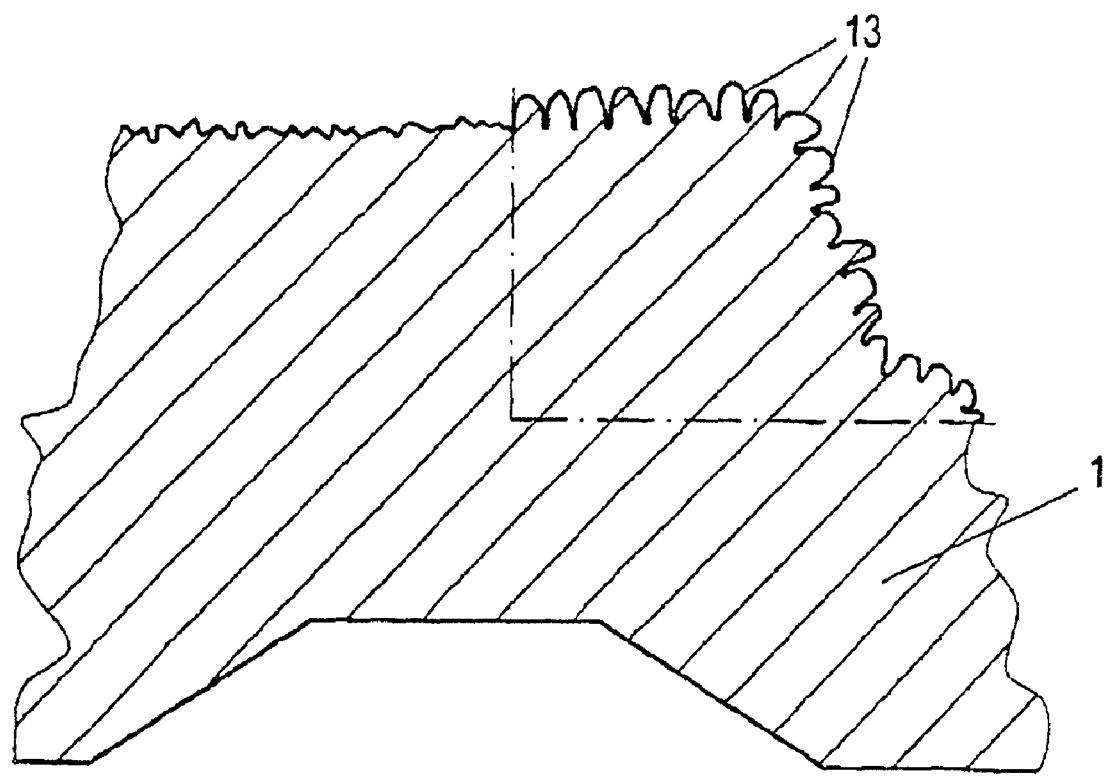
FIG. 5 is a greatly enlarged cross-sectional view of a grain peak of the dressing.

As is apparent from the right hand side part of FIG. 5, where a grain peak of a grain-textured surface of the dressing 1 is depicted on a greatly magnified scale, the grain peaks of the dressing 1 can have microscopically small, close-together, smooth elevations 13 having a diameter between 5 µm and 15 µm, which may also have the shape of fine hairs or very fine tufts of fiber, and which have a maximum length of 110 µm. These elevations are effective in ensuring that wet soils in particular stay on the smooth surface and do not descend into the hollow spaces between the grain peaks. This exploits the familiar Lotus effect as it were, and stops dirt becoming completely fixed on the surface.

It is for this same purpose that that region of the dressing 1 which was adjacent to the silicone-rubber substrate 2 and which then forms the face side comprises small amounts of substances, such as waxes or silicones, which alter the surface tension of the dressing 1 with regard to water.

Figure 6:
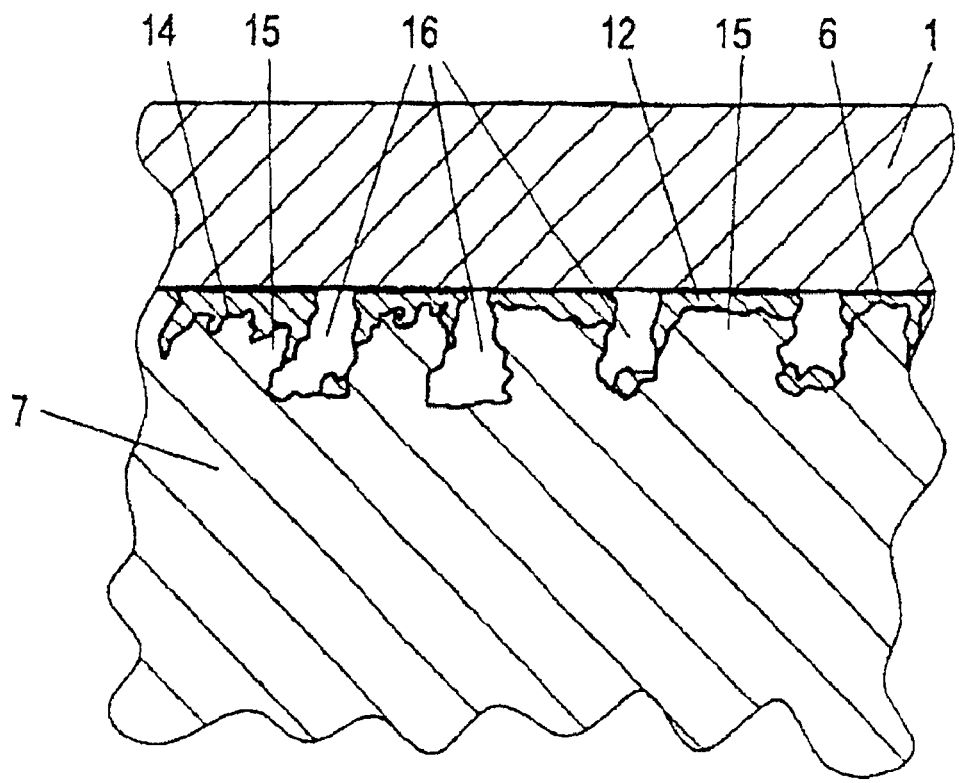
FIG. 6 depicts in section a further embodiment of a dressed leather which is in accordance with the present invention.

FIG. 6 shows, in a greatly magnified cross section, an embodiment wherein the leather 7 has a velourlike topside 14 which is formed by the buffed grain side when a grain leather is used and by the finely buffed dressing side when a split leather is used. Protruding from this topside 14 are fibers/fiber tufts 15 between which hollow spaces 16 are left unoccupied. The topside 14 has been provided with a porous dressing 1 which is formed from a polymeric dispersion applied to a substrate consisting of silicone rubber, having a textured surface and heated to consolidate the polymeric dispersion. The dressing 1 has through-capillaries, which are not depicted in the drawing. The pore structure formed by these capillaries is easily ascertainable on detaching the dressing, mechanically or chemically, from the leather 7 and then holding it up against a light source while giving it a slight stretch.

The dressing 1 is bonded to the topside 14 of the leather 7 via a bonding layer 12 which, as the drawing shows, is merely disposed partially, particularly in the region of the peaks of the fibers/fiber tufts 15, so that the hollow spaces 16 between these fibers/fiber tufts 15 are left substantially unoccupied. This engenders a high air and water vapor permeability which is improved still further by a pumping effect being engendered on loading the leather 7 which has been provided with a dressing 5.

As the drawing which depicts a greatly magnified section through the invention subject matter clearly shows, the bonding layer 12 is situated essentially on the velourlike topside 14, which has the characteristic pattern of a buffed split velour leather which, before the application of the dressing 1, is exhibits a writing effect. The bonding layer 12 is concentrated on the upper region and partly on the lateral region of the fibers/fiber tufts 15, while at most merely a minimal proportion of the bonding layer 12 is disposed at the base of the hollow spaces 16 between these fibers/fiber tufts 15 and does not cohere with the bonding layer 12 in the upper and lateral regions of the fibers/fiber tufts 15, so that air chambers result therebetween.

Figure 7:
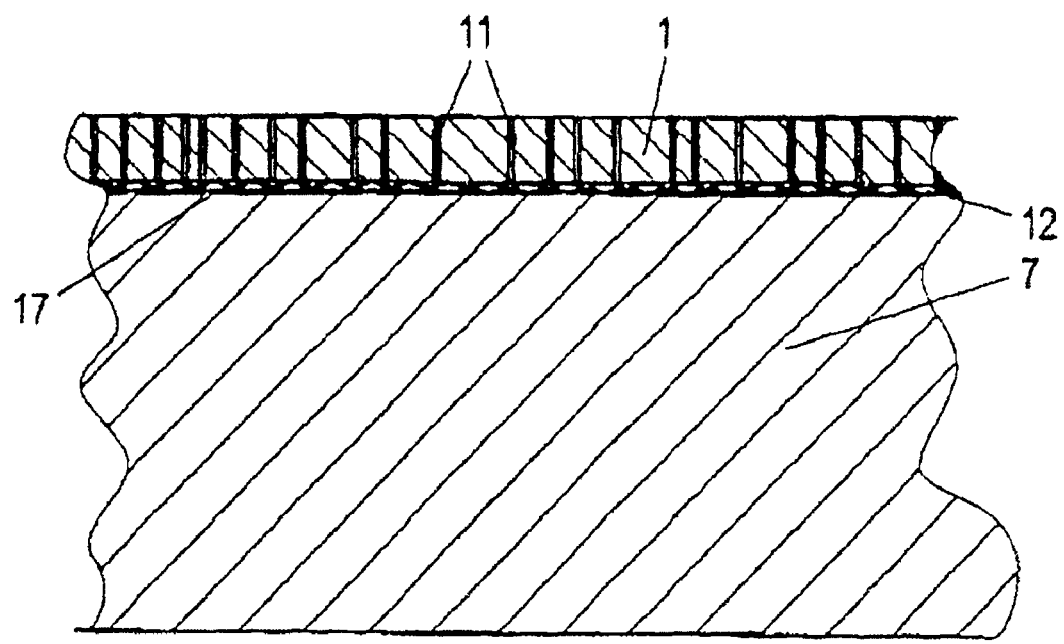
FIG. 7 is a greatly enlarged sectional view of a further embodiment of a dressed leather which is in accordance with the present invention and FIG. 8 likewise shows in section a dressed leather which is in accordance with the present invention and which has been provided with a synthetic woven or knit on its flesh side.

FIG. 7 shows an embodiment wherein a grain leather 7, which has been incipiently buffed on its grain side, or a split leather 7 having a buffed topside has been provided with a dressing 1 which includes capillaries 11 which extend through its entire thickness. The dressing 1 consists of a consolidated, polyurethane-containing, crosslinked polymeric dispersion and is produced separately by applying to a warm substrate 2 composed of a silicone rubber having a textured surface, an aqueous polyurethane dispersion in the form of a fine sprayed mist which consolidates immediately on landing on the substrate to form the requisite through-capillaries 11 in the consolidated dispersion.

The thus separately produced dressing 1 is immediately after its consolidation bonded to the topside of leather 7 via a bonding layer 12 applied thereto. In the embodiment depicted in FIG. 7, this bonding layer 12 has a point-, screen- or grid-shaped texture, preferably a netlike texture, so that it is only at individual points that a bond is formed between the topside of the leather 7 and the dressing 1 and interruptions 17 are created therebetween, which communicate with the capillaries 11 in the dressing 1 and thereby ensure the desired air and water vapor permeability.

The interruptions 17, which form a netlike structure, can have any desired shape and be, for example, round, rectangular or linear, or else may have any other suitable shape.

Figure 8:
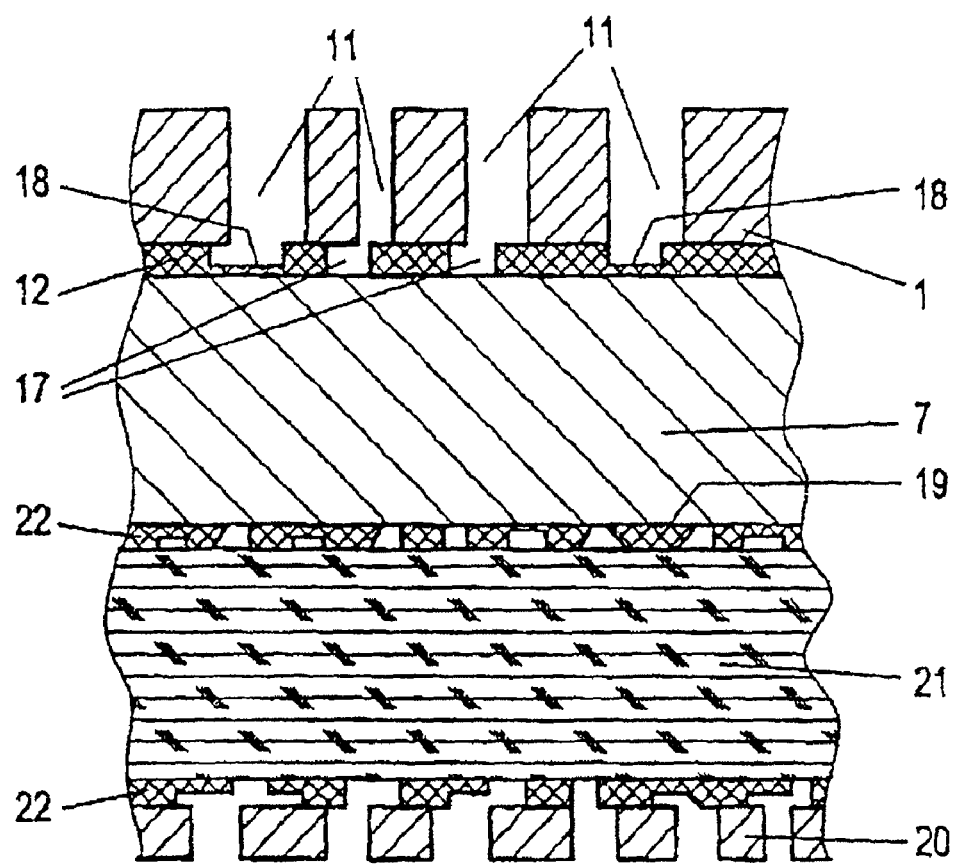

The embodiment depicted in FIG. 8 provides not just such interruptions 17 in the bonding layer 12, but the latter also has weak places 18, the thickness of which is substantially less than the remaining thickness of the bonding layer 12, so that it is also via these weak places 18 that the air and water vapor permeability is substantially enhanced and the bendability and the adhesion between the topside of the leather and the dressing is improved.

Advantageously, the bonding layer 17 here has a maximum thickness between 0.01 mm and 0.05 mm, although the weak places 18 merely have a thickness between 0.002 mm and 0.01 mm.

The flesh side 19 of the leather 7 in the embodiment depicted in FIG. 8 is provided with a substantially roughened synthetic woven or knit 21 which has protruding fibers and which may be covered by a thin coating 20. This serves to confer more volume on the dressed leather.

The bond between the flesh side and the woven or knit is effected using an adhesive such that an adhesive effect is produced between the fibers only.

Such a configuration is advantageous particularly in relation to using cut formats of the inventive leather for shoe manufacture, since in this case the open-pore thin coating serves as lining material and consequently there is no need for separate application of such a lining material. When the leather of the present invention is used in shoes, the leather's high water vapor permeability will ensure that the perspiration from the foot is conducted away and the leather's high air permeability will ensure ventilation of the shoe interior; when the leather of the present invention is used for auto seats and upholstered furniture, the moisture generated passes through the dressing to be absorbed by the leather.

The through-capillaries 11 in the dressing 1, which form a net structure, are distinctly visible at as little as 45-fold magnification and a 25% stretch under illumination. When the dressing 1 is removed from the bonding layer 12 mechanically or chemically with the aid of solvents, even a merely 16-fold magnification will show that the bonding layer 12 has weak places as well as thick places, and that there are likewise pore-shaped interruptions in the weak places. To determine the thickness of the detached dressing, the dressing film has a thickness of not more than 0.06 mm under a contact pressure of 2 kg/cm$^2$.

In all the embodiments described, not only the dressing 1 but also the bonding layer 12 may include hollow microspheres having a diameter of less than 21 μm.

The leather of the present invention has similar to equivalent properties to semi-aniline leather with regard to air and water vapor permeability, and is superior to a mechanically apertured leather, but its face side is also mechanically very robust and also lightfast and soil repellent.

The present invention is useful for cattlehide leathers in particular, but also for hog, calf, goat and sheep leathers which have been buffed on their grain side, particularly when such leathers are used for shoe manufacture, but also when synthetic velour material is used as carrier.

Figure 10:
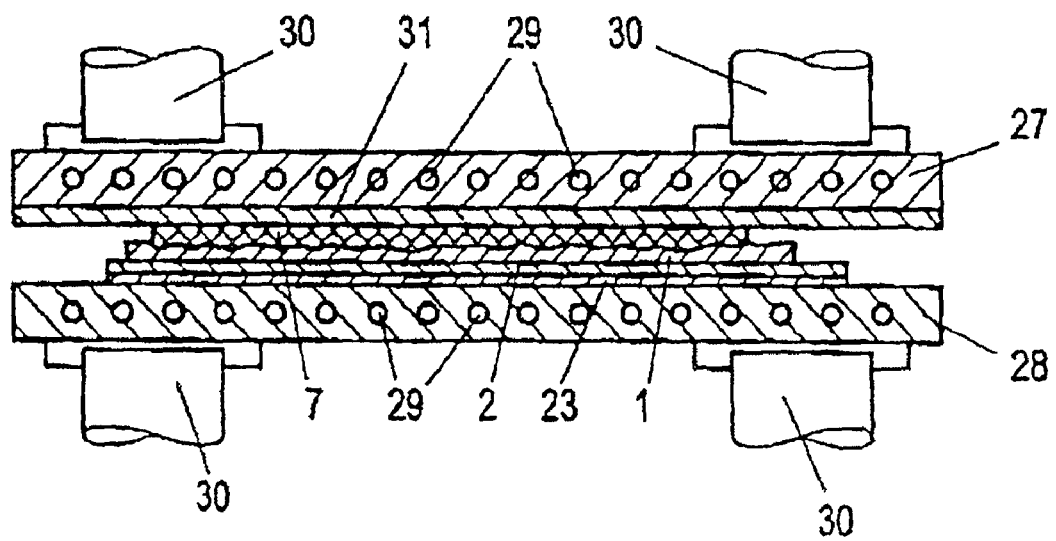

The production of the dressing 1 is more particularly elucidated with reference to FIG. 9. An elastomeric substrate 2, the textured surface 3 of which corresponds to the grain texture of the dressing 1 to be produced, and which is firmly connected to a heat-conducting supporting plate 23 of aluminum sheet, is heated via heating means such that the surface 3 of substrate 2 has a temperature of about 80° C. It is onto this heated surface 3 that a polyurethane dispersion is applied, via spray nozzles 24 having a small diameter, in the form of a fine mist 25, while the substrate 2 advances in the direction of arrow 26. At the latest on landing on the warm surface 3 of substrate 2, the sprayed mist 25 consolidates as a result of the removal of water, so that a thin, netlike film which includes capillaries 11 is formed on the substrate 2. As soon as this film is dry to the touch, a leather 7 bearing on its topside a polymeric dispersion forming the bonding layer 12 is laid with this topside onto the film and pressed together with the substrate 2 in a press depicted in FIG. 10. This press includes two metallic platens 27, 28, in which heating elements 29 are embedded. The platens 27, 28 are mounted on supports 30 to be hydraulically moveable.

The upper platen 27 supports an elastomeric pad 31. The leather 7 which was placed with its topside, which supports the bonding layer 12, onto the dressing 1 on the substrate 2 is then positioned with this substrate 2 between platens 27, 28, whereupon these platens are used to exert an adjustable molding pressure of about 3.5 kg/cm$^2$ and at the same time the platens 27, 28 are heated to an adjustable temperature of about 90° C. The elastomeric pad 31 on the one hand and the elastomeric constitution of the substrate 2 on the other ensure that the capillaries 11 in the dressing 1 and the interruptions in the bonding layer 12 remain intact as pressure is exerted and therefore the requisite air and water vapor permeability is ensured.

Figure 11:
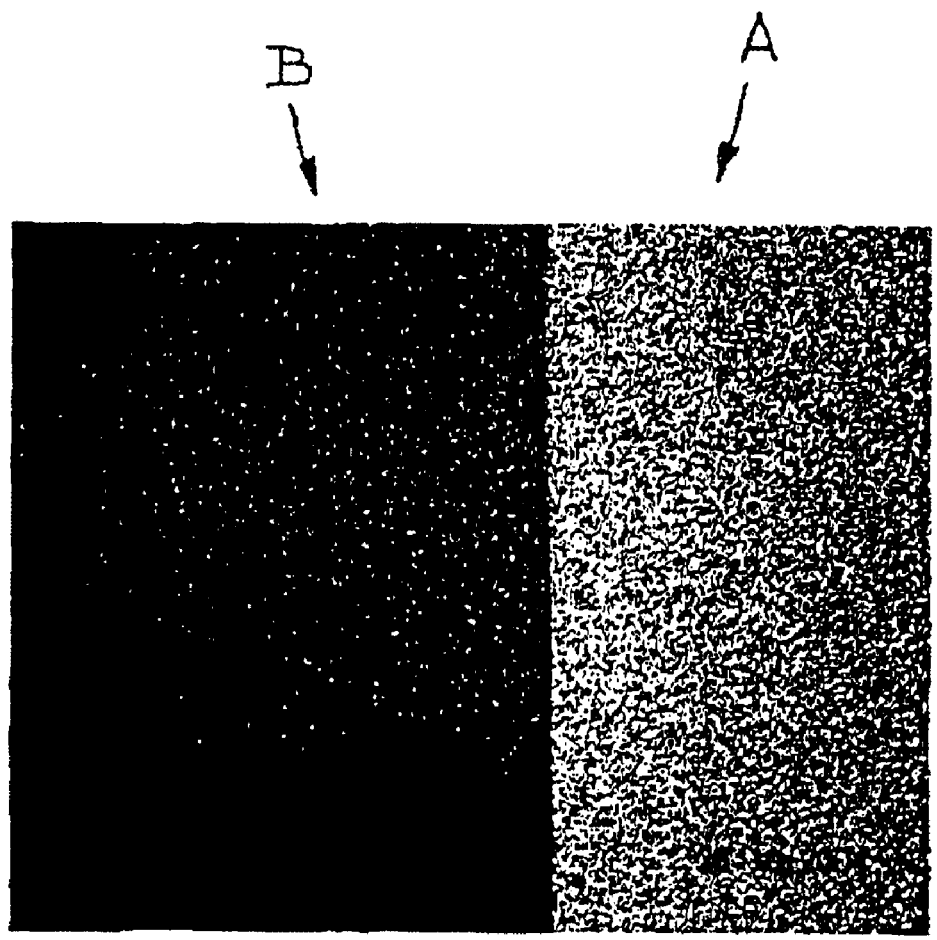
FIG. 11 is a photograph of the face side of the dressing provided in a leather which is in accordance with the present invention.

FIG. 11 shows a photograph of the dressing 1, produced on a substrate 2 and forming part of the leather of the present invention. The right-hand side region A was illuminated with a light source from the underside as the photograph was being taken, and clearly shows that the dressing has a netlike structure, i.e., possesses through-capillaries, while the left-hand side region B, where the underside was covered, clearly shows the grain texture of the dressing.

The invention was elucidated with reference to the drawings in connection with a leather being used as carrier. In place of leather, however, it is also always possible to use a synthetic velour material as carrier.

EXAMPLES

Example 1

A piece of gray chrome-tanned low-fogging calf leather having a thickness of about 1.2 mm and a size of 2.10 m$^2$ is very lightly buffed on its grain side with a 280 particle size abrasive paper such that the hair pores remain substantially intact. The leather is subsequently milled for six hours.

An elastomeric substrate of silicone rubber having a thickness of about 2 mm, which is firmly bonded on its underside to a supporting plate of an approximately 1.5 mm thick aluminum sheet by adhering and which has a textured surface which is the negative correspondence to a natural full-grain calf leather hide and which has a temperature of 91° C. everywhere has a polyurethane dispersion mixture applied to it at a rate of 88 g/m$^2$. The dispersion mixture consists essentially of 680 g of a nonthermoplastic polyurethane dispersion having a softening point of about 195° C., which cannot be made to melt after water withdrawal since the temperature of destruction is below the melting temperature, and of 250 g of a finely divided thermoplastic polyurethane dispersion having a softening point of about 62° C., a melting point of about 95° C. and whose tackiness point immediately after drying but before crosslinking starts at a temperature of about 55° C.

This dispersion mixture also includes 4% by weight of an 80% strength polyisocyanate crosslinker, based on the polyurethane solids content of the dispersion, 8.5% by weight of black pigment based also on the polymeric solids content, 2.5% by weight of a silicone hand modifier having a solids content of about 45%, 1% by weight of hollow microspheres based on the entire weight having a diameter less than 21 μm, and also 0.5% by weight of an acrylate-based thickener. This mixture composition has a polymeric solids content of about 35% by weight. Application is effected without air admixture using two spray nozzles each having a diameter of 0.46 mm at a pressure of 65 bar.

The two spray nozzles are spaced apart in succession at a distance of 80 cm from the moving substrate in the direction of movement thereof, and move transversely to this direction of movement. The substrate is somewhat larger than the piece of calf leather. The substrate takes about 14 seconds to travel through the spray station with the two spray nozzles and is still at a temperature of 59° C. After being subjected for about two minutes to a stream of dry hot air at about 85° C., the dressing thus produced, which consists of a netlike film, is water- or almost water-free.

Soon thereafter, the leather is sprayed, preferably again without air admixture, by two spray nozzles having a nozzle diameter of 0.52 mm at a spray angle of 80°, emerging from the nozzles, with a dispersion comprising a polyurethane mixture. The add-on rate is about 90 g/m$^2$ wet. At this sprayed add-on level, the fine droplets are immediately on landing on the leather deprived of sufficient water by the wicking effect of the leather that a netlike structure having many through-capillaries is formed here also. The sprayed add-on is dry to the touch after three minutes even without heating, and forms a thermoplastic bonding layer, and the leather can be placed with that bonding layer onto the dressing which is on the preferably still warm substrate and bonded to this dressing in a heated press between elastomeric supports.

Owing to the good thermal conductivity of the supporting plate consisting of aluminum, the heat is rapidly absorbed by the press and transmitted to the thermoplastic bonding layer. A press hotplate temperature of 90° C., a molding pressure of about 2 bar at the leather and 48° C. as inlet temperature for the substrate with the leather resting thereon will need a residence time in the press of less than 25 seconds. The bond between the elastomeric surface of the substrate and the aluminum support offers advantages not only with regard to the pressing but also with regard to the spraying, since the warm aluminum plate serves as heat store and continuously gives off heat to the substrate during the spraying operation.

The thermoplastic polyurethane dispersion mixture forming the bonding layer consists essentially of 700 g of a finely divided polyurethane dispersion having a softening point of about 62° C. and an onset of tackiness point of about 55° C., 180 g of very soft polyacrylate, 200 g of polyurethane having a softening point of about 170° C., 9% by weight of crosslinker based on the overall batch, and also 3% by weight of black pigment. The final leather after dressing has almost the same softness as before. Its water vapor transmission rate is 3.6 mg/cm$^2$·h, and it is so air-permeable that air can be blown through it by mouth.

Example 2

A piece of chromeless-tanned low-fogging black cattlehide leather having a thickness between 1.10 mm and 1.25 mm and a size of 5.2 m$^2$ was buffed on its grain side with 150 particle size abrasive paper and subsequently milled for 12 hours. After milling, the flanks are spongy and pipey and would, if the entire hide were dressed by following existing processes, cause about 50% of the area after dressing to become inutile for styling the surface with a medium-fine embossed pattern.

The butt piece of the hide, which after milling is still fairly tight-grained and suitable for dressing with a medium-fine embossed pattern, measures 1.95 m$^2$. This part was taken from the hide and dressed.

A heated substrate at 90° C., the textured surface of which is the negative correspondence to a medium-fine nappa pattern, is sprayed via three spray nozzles as described in example 1 with a polymeric dispersion mixture in an amount of 135 g/m$^2$ so as to form a netlike film forming the dressing. The composition of the dispersion mixture only differs from that recited in example 1 in that 580 g of thermoplastic polyurethane, instead of 680 g, and 350 g of nonthermoplastic polyurethane, instead of 250 g, are used.

The surface of the substrate is warm throughout the entire spraying operation, since the supporting plate of aluminum sheet gives off heat to the substrate.

At approximately the same time, the leather butt piece which was sprayed with the polymeric dispersion to form the bonding layer as described in example 1 was placed onto the warm substrate at about 39° C. and press molded as described in example 1. After pressing, the leather was aged in the suspended state for 30 minutes and then laid down on a pallet. The dressed surface is free of any funnellike collapsed places, and the numerous through-capillaries present are not visible. The water vapor transmission rate is 2.9 mg/cm$^2$·h. Air can be blown through the leather by mouth.

Example 3

Parts for vehicle seats are roughly format-cut out of the spongy leather flanks by die cutting. A hot elastomeric silicone-rubber substrate at 95° C., the textured surface of which is the negative correspondence to a very coarse grain and where the height differences between grain peaks and grain valleys on average 0.05 mm, is sprayed in a first step, via two spray nozzles, with the same mixture in the same amount as described in example 1. A uniformly thick, netlike, dressing film forms not only on the grain peaks but also in the grain valleys. Thereafter, the hot film at about 65° C. on the substrate is sprayed, via one spray nozzle, with a mixture as described in example 2 in an amount of 60 g/m$^2$. This sprayed add-on likewise solidifies on landing on the first warm sprayed add-on and thus thickens the first film uniformly not only in the region of the grain peaks but also in the region of the grain valleys. Using a corotating applicator roll, a thermoplastic dispersion mixture as per example 1, which forms the bonding layer, was applied to the leather in an amount of about 55 g/m$^2$ so as to form an overwhelmingly coherent film having comparatively thick zones and having thin zones. Placing the carrier on the film and pressing were carried out as described in example 1.

The final leather no longer appears spongy, is soft and has a water vapor transmission rate of 1.95 mg/cm$^2$·h, and air can be blown through it.

Example 4

A piece of finely buffed split cattlehide leather having a thickness between 1.2 mm and 1.3 mm and a size of 1.6 m$^2$ is dressed as described in example 2. After dressing, it is still so air-permeable that air can be blown through it, and has almost the same softness as before dressing.

Example 5

A leather having a nubucklike dressing is produced using a substrate of silicone rubber which has fine depressions as well as a rough surface. The depressions to form the nubuck effects, which resemble fine hairs, were introduced by a laser treatment of the surface of the substrate.

The hot substrate at 40° C., which is bonded to a supporting plate of aluminum sheet, is sprayed, via a high-pressure spray nozzle, with a particularly finely divided, low-viscosity polyurethane dispersion having a solids content of about 25%. The dispersion is more than 80% by weight nonthermoplastic polyurethane and comprises 5% of crosslinker and 4% of a 60% strength aqueous silicone emulsion and also pigments. The add-on rate is about 60 g/m$^2$. Thereafter, the silicone substrate is heated to 60° C. and then a polyurethane dispersion mixture as described in example 1 is applied via two spray nozzles. These two dispersion add-ons form the dressing having a structure like a fine net.

A piece of chrome-tanned cattlehide leather whose grain side was buffed with 320 particle size abrasive paper and milled for 8 hours was divided into cut formats for auto seats. The cut formats had a bonding layer applied to them as described in example 1. Pressing was likewise carried out as mentioned in example 1. The final leather has an attractive nubuck surface with a pleasant hand, and fulfils all the parameters of the vehicle industry. It is water vapor permeable and air can be blown through it by mouth.

It was found that, in the carrier according to the present invention, not just the air and water vapor permeability but also the mechanical strength properties, particularly the abrasion and scratch resistance, can be significantly improved after completed crosslinking, particularly when the dressing is formed using known nonthermoplastic polyurethane dispersions and polyurethane dispersions used as adhesive starting material as a blend. It was determined that a thus dressed carrier transmits more than 10 l/min of air per 100 cm² at a pressure of 2 bar.

Blending such dispersions can be used to vary not just the desired softening point, but all other properties can also be improved.

When the carriers of the present invention are compared with known carriers, irrespectively of how these were produced, they are found to have—for comparable thickness of dressing—a significantly higher water vapor permeability, and a high air permeability, which is completely absent from all other carriers with comparable thickness of dressing. These carriers also meet the CROCKMETER TEST in combination with MEK, as stipulated by the U.S. automotive industry. MEK does penetrate into the pores of the carrier, but without damaging the surface and without engendering color changes.

Carriers provided with a dressing having a nubuck surface with very fine hairs fulfill all the parameters stipulated by the vehicle industry, unlike genuine nubuck leathers. They are easy-care, do not become greasy, always remain matte and, in contradistinction to synthetic nubuck, are not flammable and temperature and solvent resistant.

Example 6

To endow not only a leather having a finely fibrous velour-like surface but also a textile carrier which consists of microfibers and has a finely fibrous surface with a nubuck effect, so that the two materials with the different carriers later show the same surface in order to be processed in combination in a vehicle or as upholstered furniture cover, the procedure is as follows:

The substrate consists of silicone rubber and has a negative nubuck texture, i.e., the surface is rough and has depressions which lead to the formation of very fine hairs or very fine tufts of fiber. The depressions were introduced into the substrate by means of a laser to be very close to each other. This negative surface of the silicone-rubber substrate was coated in the manner of a self-supporting film with a plastics material in order that the negative texture of the silicone surface may be transferred positively to the plastics film. This plastics film serves as master for negative molding of silicone substrates which then in turn contain the nubuck texture. This has the advantage that it is not necessary to laser every silicone-rubber substrate, since, in accordance with the present invention, the lasered mold can be multiplied via the master.

The substrate has a thickness of 2 mm, is bonded to an aluminum sheet by adhering, and has a length of 2 m and a width of 1.5 m. The substrate is heated to a temperature of 66° C. and sprayed under the conditions recited in example 1.

Soon thereafter the leather and a microfibrous nonwoven web material, the hollow spaces of which are filled with a coagulated polyurethane, the material having a velourlike surface formed by the protruding microfibers, are sprayed with the polymeric dispersion as described in example 1 and both the carriers are placed after about 5 minutes, i.e., when dry to the touch, on the still-warm substrate and press molded under conditions as indicated in example 1.

The material is removed from the press after about 15 seconds. It shows a classy nubuck effect with its fine protruding hairs, which have a writing effect typical of nubuck.

It is possible to blow through both nubuck materials and, after their crosslinking, to extinguish a cigarette on them without damage. It is also possible to contact it with many solvents, including mineral spirits and MEK, without damaging the surface.

Both materials have a pronounced pumping effect, i.e., a drop of water will transfer within a short time through the dressing into the carrier on application of pressure, stressing and relaxing. Both materials with the nubuck-type surface have the advantage over genuine nubuck leather of not becoming greasy. A detensioned drop of water, applied to the surface, will disappear into the surface within two minutes without pumping effect.

The synthetic carrier material is always cut as format or roughly formatted part from a continuous sheet material before spraying.

One immense advantage is that the leather and the textile carrier of microfibers are dressed with the same nubuck surface and, when processed together, fit together optimally colorwise and handwise and age together; that is, the dressing of the two materials has the same appearance even after a long time.

The present invention provides a nubuck effect or grained nubuck effect which is always classier than a velour effect. In the realm of the present invention it is possible to provide coagulated and buffed microfiber nonwovens, such as for example alcantara with its velour effect with a nubuck dressing which is visually classier and which eliminates disadvantages such as lack of thermal stability, soilability, etc.

The invention claimed is:

1. A carrier having a finely fibrous topside,
   wherein the carrier is provided with a dressing which has a grain texture having grain peaks and grain valleys on its face side,
   wherein the dressing comprises a consolidated polymeric dispersion,
   wherein the dressing is bonded to the carrier via a single thin bonding layer formed from a consolidated, polyurethane-containing polymeric dispersion and having been applied to the topside of the carrier,
   wherein the dressing has capillaries which extend through its entire thickness, and
   wherein the dressing has substantially the same thickness in the region of the grain peaks and in the region of the grain valleys.

2. The carrier of claim 1, wherein the carrier has a grain leather having a buffed grain side forming the topside.

3. The carrier of claim 1, wherein the carrier has a split leather having a buffed topside.

4. The carrier of claim 1, wherein the carrier has a synthetic velour material having a topside consisting of microfibers.

5. The carrier of claim 1, wherein the dressing consists of the consolidated polymeric dispersion.

6. The carrier of claim 1, wherein the capillaries have different cross sections.

7. The carrier of claim 1, wherein the capillaries are randomly distributed in the dressing.

8. The carrier of claim 1, wherein the capillaries have a diameter between 0.005 mm and 0.05 mm.

9. The carrier of claim 1, wherein the capillaries have a diameter between 0.009 mm and 0.02 mm.

10. The carrier of claim 1, wherein the dressing has at least 100 capillaries per an area of 100 cm².

11. The carrier of claim 1, wherein the dressing has at least 250 capillaries per an area of 100 cm².

12. The carrier of claim 1, wherein the capillaries form substantially straight lines.

13. The carrier of claim 1, wherein the bonding layer has interruptions.

14. The carrier of claim 1, wherein the bonding layer has weak places of reduced thickness.

15. The carrier of claim 1, wherein the bonding layer is arranged partially on the surface of the carrier.

16. The carrier of claim 1, wherein the bonding layer has a point-, screen- or grid-shaped texture.

17. The carrier of claim 1, wherein the bonding layer has a netlike texture.

18. The carrier of claim 14, wherein the bonding layer has a maximum thickness between 0.01 mm and 0.05 mm and has a thickness between 0.002 mm and 0.01 mm in its weak places.

19. The carrier of claim 1, wherein the topside is fibrous and the bonding layer is predominantly disposed in the region of the fiber tips, leaving hollow spaces therebetween which cause a pumping effect.

20. The carrier of claim 1, wherein the bonding layer consists of a consolidated, polyurethane-containing, crosslinked polymeric dispersion.

21. The carrier of claim 1, wherein the bonding layer consists of a consolidated polyester-polyurethane dispersion.

22. The carrier of claim 1, wherein the polyurethane-containing dispersion has at least in part a wholly or partly crystalline structure.

23. The carrier of claim 1, wherein the polymeric dispersion comprises tackifying additives.

24. The carrier of claim 1, wherein the bonding layer has a foam structure.

25. The carrier of claim 1, wherein the bonding layer contains hollow microspheres having a diameter of less than 21 μm.

26. The carrier of claim 1, wherein the bonding layer has an areal weight between 20 g/m² and 90 g/m².

27. The carrier of claim 1, wherein the dressing has approximately the same structure and the same density in all cross-sectional regions.

28. The carrier of claim 1, wherein the dressing consists of a combination of a consolidated polyurethane dispersion comprising a crosslinker and having a high softening point, and a consolidated polyurethane dispersion comprising a crosslinker, said dispersion being thermoplastic before crosslinking.

29. The carrier of claim 28, wherein the consolidated polyurethane dispersion has a wholly or partly crystalline structure having a low softening point.

30. The carrier of claim 1, wherein the dressing contains hollow microspheres which form closed cells and have a diameter of less than 21 μm.

31. The carrier of claim 1, wherein the grain peaks in the dressing comprise microscopically small smooth elevations.

32. The carrier of claim 1, wherein the face side of the dressing has a nubuck texture whence protrude fine hairs forming microscopically small elevations.

33. The carrier of claim 29 or 30, wherein the elevations have a diameter between 3 μm and 60 μm and also a maximum length of 110 μm.

34. The carrier of claim 31, wherein the elevations have a diameter between 5 μm and 15 μm.

35. The carrier of claim 1, wherein the dressing comprises waxes and/or silicones on its face side.

36. The carrier of claim 1, wherein the face side of the dressing is provided with a thin finish.

37. The carrier of claim 1, wherein its side opposite to the topside provided with the dressing is provided with a substantially roughened synthetic woven or knit having projecting fibers.

38. The carrier of claim 37, wherein the woven or knit is covered by a thin coating.

39. The carrier of claim 1, consisting of a cut format.

40. The carrier of claim 39, consisting of a cut format in the belly region of a leather hide and including a dressing having a highly defined grain texture.

41. The carrier of claim 39, consisting of a cut format in the butt region of a leather hide and including a dressing having a flat grain texture.

42. A method of producing the carrier of claim 1, comprising:
applying an aqueous polymeric dispersion to a silicone rubber substrate which has a textured surface corresponding to the grain texture of the dressing, to form a film;
applying a polymeric dispersion to the topside of the carrier to form a bonding layer;
placing the topside onto the film and applying a pressure and heat treatment; and
applying a solvent-free polymeric dispersion comprising polyurethane and a crosslinker to the substrate having a uniform temperature of less than 105° C., wherein the solvent-free polymeric dispersion immediately consolidates on impinging on the substrate and, after evaporation of water, a uniformly thick film having a net structure and a thickness of less than 0.04 mm is formed.

43. The method of claim 42, wherein the polymeric dispersion used consists of a combination of a polyurethane dispersion comprising a crosslinker and having a high softening point and a polyurethane dispersion comprising a crosslinker and having a wholly or partly crystalline structure having a low softening point, said dispersion being thermoplastic before crosslinking.

44. The method of claim 42, wherein the polymeric dispersion is applied to the heated substrate by means of a fine mist produced by spraying nozzles having a small diameter.

45. The method of claim 44, wherein the spraying is effected without air admixture at a pressure between 40 bar and 100 bar using spray nozzles having a diameter of less than 0.04 mm.

46. The method of claim 42, wherein the textured surface of the substrate is produced by molding off the grain texture of a natural leather.

47. The method of claim 42, wherein the textured surface of the substrate is produced by laser treatment.

48. The method of claim 47, wherein the laser treatment produced textured surface of the substrate is multiplied via a master.

49. The method of claim 42, wherein the substrate consists of addition-crosslinked silicone rubber and has a Shore hardness between 25 Shore A and 70 Shore A.

50. The method of claim 42, wherein the substrate is composed of a heat-conductive silicone rubber having a density of more than 110 g/cm³.

51. The method of claim 50, wherein the substrate is composed of a heat-conductive silicone rubber having a density of more than 120 g/cm³.

52. The method of claim 51, wherein the substrate has inorganic fillers embedded in it.

53. The method of claim 42, wherein the substrate is bonded to a metallic support.

54. The method of claim 53, wherein the substrate is bonded adhesively to the metallic support.

55. The method of claim 53, wherein the support is aluminum.

56. The method of claim 53, wherein the support consists of an aluminum sheet between 1 mm and 3 mm in thickness.

57. The method of claim 53, wherein the bonding of the substrate to the metallic support is effected by means of a one-component silicone adhesive which embeds a thin nonwoven web material of synthetic fibers with a basis weight of less than 150 g/m².

58. The method of claim 42, wherein the polymeric dispersion applied to the topside of the carrier consists essentially of a polyurethane dispersion which has a low softening point and a wholly or partly crystalline structure and of a crosslinker, such that, on impinging on the topside of the carrier, it rapidly consolidates and forms a noncoherent bonding layer.

59. The method of claim 58, wherein the polyurethane dispersion has a wholly or partly crystalline structure.

60. The method of claim 42, wherein the polymeric dispersion applied to the topside of the carrier consists essentially of a polyurethane dispersion which has a low softening point and a wholly or partly crystalline structure and of a crosslinker, such that, on impinging on the topside of the carrier, it rapidly consolidates and forms a bonding layer having weak places of reduced thickness.

61. The method of claim 42, wherein the substantially water-free, net-structured film on the substrate has the topside of the carrier, which is provided with the dispersion forming the bonding layer, placed on it as soon as this dispersion is dry to the touch but still contains residual moisture.

62. The method of claim 42, wherein the net-structured film on the substrate and the carrier placed on said film and provided with the polymeric dispersion forming the bonding layer are pressed together between resilient platens at a temperature between 60° C. and 105° C. and at a pressure of not more than 5 kg/cm².

63. The method of claim 62, wherein after pressing the carrier provided with the dressing is subjected in the suspended state to drying to completion.

64. The carrier of claim 1, wherein the carrier comprises a leather.

* * * * *